US012626257B2

(12) United States Patent
Sivajothi et al.

(10) Patent No.: US 12,626,257 B2
(45) Date of Patent: May 12, 2026

(54) INTELLIGENT TECHNICAL PROTOCOL BASED APPROACH LEVERAGING AI-ML TO BLOCK VISHING SCAMMERS

(71) Applicant: Bank of America Corporation, Charlotte, NC (US)

(72) Inventors: Sivashalini Sivajothi, Chennai (IN); Maneesh Kumar Sethia, Hyderabad (IN); Boddu Vikas Teja, Chandanagar (IN); Ankit Kumar Sahoo, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 91 days.

(21) Appl. No.: 18/763,525

(22) Filed: Jul. 3, 2024

(65) Prior Publication Data
US 2026/0012484 A1     Jan. 8, 2026

(51) Int. Cl.
H04L 9/40        (2022.01)

(52) U.S. Cl.
CPC ...... H04L 63/1483 (2013.01); H04L 63/0823 (2013.01); H04L 63/1425 (2013.01)

(58) Field of Classification Search
None
See application file for complete search history.

(56) References Cited

U.S. PATENT DOCUMENTS 7,441,429 B1 * 10/2008 Nucci ................. H04L 63/1416
                                                  709/224
9,942,752 B1    4/2018 Marimuthu 10,455,085 B1   10/2019 Roundy et al.
10,645,216 B1 *  5/2020 Hart .................... H04M 3/4936
10,778,839 B1    9/2020 Newstadt et al.
10,911,596 B1    2/2021 Do et al.
11,102,344 B1    8/2021 Buentello et al.
(Continued)

FOREIGN PATENT DOCUMENTS

CA      3215224 A1     9/2022
CN     102598641 A     7/2012
(Continued)

*Primary Examiner* — Khang Do
(74) *Attorney, Agent, or Firm* — Banner & Witcoff, Ltd.

(57) ABSTRACT

Systems and methods detect and prevent vishing attacks through an integrated framework combining SIP header customization, STIR/SHAKEN frameworks, AI/ML analysis, and real-time speech analysis using the Viterbi algorithm. The system begins with call initiation, embedding authentication information in the SIP header. The SIP data is transmitted and verified using STIR/SHAKEN frameworks, ensuring the authenticity of the caller's identity. Verified data is cross-referenced with third-party databases and analyzed by an AI/ML engine to detect anomalies. If potential fraud is detected, the call is blocked, and the customer is notified. Calls that pass initial checks are further analyzed using the Viterbi algorithm, which converts speech to text and identifies suspicious patterns. An anomaly pattern detector processes the converted text to detect vishing indicators, terminating the call if a match is found. This multi-layered approach ensures robust protection against vishing, enhancing the security and reliability of voice communications while safeguarding users from fraud.

20 Claims, 5 Drawing Sheets

(56) References Cited

U.S. PATENT DOCUMENTS

| | | | |
|---|---|---|---|
| 11,343,374 B1 | 5/2022 | Rolia et al. | |
| 11,595,435 B2 | 2/2023 | Singh et al. | |
| 11,683,411 B1 | 6/2023 | Koster | |
| 11,924,245 B2 | 3/2024 | Grewal et al. | |
| 12,301,614 B1* | 5/2025 | Payne | H04L 63/1491 |
| 2002/0010587 A1 | 1/2002 | Pertrushin | |
| 2003/0182214 A1 | 9/2003 | Taylor | |
| 2007/0150773 A1 | 6/2007 | Srivastava | |
| 2007/0165821 A1 | 7/2007 | Altberg et al. | |
| 2009/0217039 A1* | 8/2009 | Kurapati | H04L 9/3273 |
| | | | 713/168 |
| 2010/0175122 A1 | 7/2010 | Ballard | |
| 2013/0232560 A1 | 9/2013 | Luo et al. | |
| 2014/0376705 A1* | 12/2014 | Layman | H04M 3/38 |
| | | | 379/114.14 |
| 2015/0026786 A1* | 1/2015 | Alexander | H04W 12/128 |
| | | | 726/7 |
| 2015/0030156 A1* | 1/2015 | Perez | H04L 63/0428 |
| | | | 380/270 |
| 2016/0344770 A1 | 11/2016 | Verma et al. | |
| 2017/0118256 A1 | 4/2017 | Bouvet | |
| 2017/0118335 A1 | 4/2017 | Brackett et al. | |
| 2017/0295157 A1* | 10/2017 | Chavez | H04L 9/3239 |
| 2017/0302793 A1* | 10/2017 | Stock | H04M 3/42059 |
| 2018/0027013 A1 | 1/2018 | Wright et al. | |
| 2018/0198796 A1 | 7/2018 | Chien | |
| 2018/0205754 A1* | 7/2018 | North | H04L 63/145 |
| 2018/0278746 A1* | 9/2018 | Yacov | H04M 7/0012 |
| 2018/0376279 A1* | 12/2018 | Hassan | H04W 4/021 |
| 2019/0174000 A1 | 6/2019 | Bharrat et al. | |
| 2019/0297110 A1* | 9/2019 | Kras | H04L 63/1483 |
| 2020/0028690 A1 | 1/2020 | Barakat et al. | |
| 2020/0195688 A1 | 6/2020 | Prakash et al. | |
| 2020/0320619 A1 | 10/2020 | Motaharian et al. | |
| 2020/0366712 A1 | 11/2020 | Onut et al. | |
| 2021/0203691 A1 | 7/2021 | Pratt et al. | |
| 2021/0203693 A1 | 7/2021 | Clausen et al. | |
| 2021/0243204 A1* | 8/2021 | Taylor | H04L 63/1408 |
| 2021/0407514 A1 | 12/2021 | Laird et al. | |
| 2022/0245639 A1 | 8/2022 | Cousins | |
| 2022/0247866 A1 | 8/2022 | Xiao-Devins et al. | |
| 2023/0088868 A1* | 3/2023 | Haltom | H04M 3/42059 |
| | | | 370/352 |
| 2023/0164198 A1 | 5/2023 | Bhattacharjee et al. | |
| 2023/0229755 A1* | 7/2023 | Maiman | G06F 11/34 |
| | | | 726/22 |
| 2023/0316285 A1 | 10/2023 | Kramme et al. | |
| 2023/0344868 A1 | 10/2023 | Kaligotla | |
| 2023/0362299 A1* | 11/2023 | Ranalli | H04M 3/4365 |
| 2024/0040035 A1 | 2/2024 | Dropuljic et al. | |
| 2024/0422174 A1* | 12/2024 | Grover | G06N 20/00 |
| 2025/0080646 A1 | 3/2025 | Rodriguez Bravo et al. | |
| 2025/0286954 A1 | 9/2025 | Goyal et al. | |
| 2025/0358364 A1* | 11/2025 | Piscopo, Jr. | H04M 3/42042 |

FOREIGN PATENT DOCUMENTS

| | | | |
|---|---|---|---|
| EP | 4156665 A1 | 3/2023 | |
| JP | 2009512082 A | 3/2009 | |
| KR | 20070082179 A | 8/2007 | |
| KR | 20100092074 A | 8/2010 | |
| KR | 101098532 B1 | 12/2011 | |
| KR | 20130052297 A | 5/2013 | |
| KR | 101295442 B1 | 8/2013 | |
| KR | 20140070880 A | 6/2014 | |
| KR | 20150092733 A | 8/2015 | |
| KR | 20160110791 A | 9/2016 | |
| KR | 101662233 B1 | 10/2016 | |
| KR | 101793958 B1 | 11/2017 | |
| TW | 201112720 A | 4/2011 | |
| WO | 2016021978 A1 | 2/2016 | |
| WO | 2017029677 A1 | 2/2017 | |
| WO | 2024026033 A1 | 2/2024 | |

* cited by examiner

Technical Process Flow Diagram

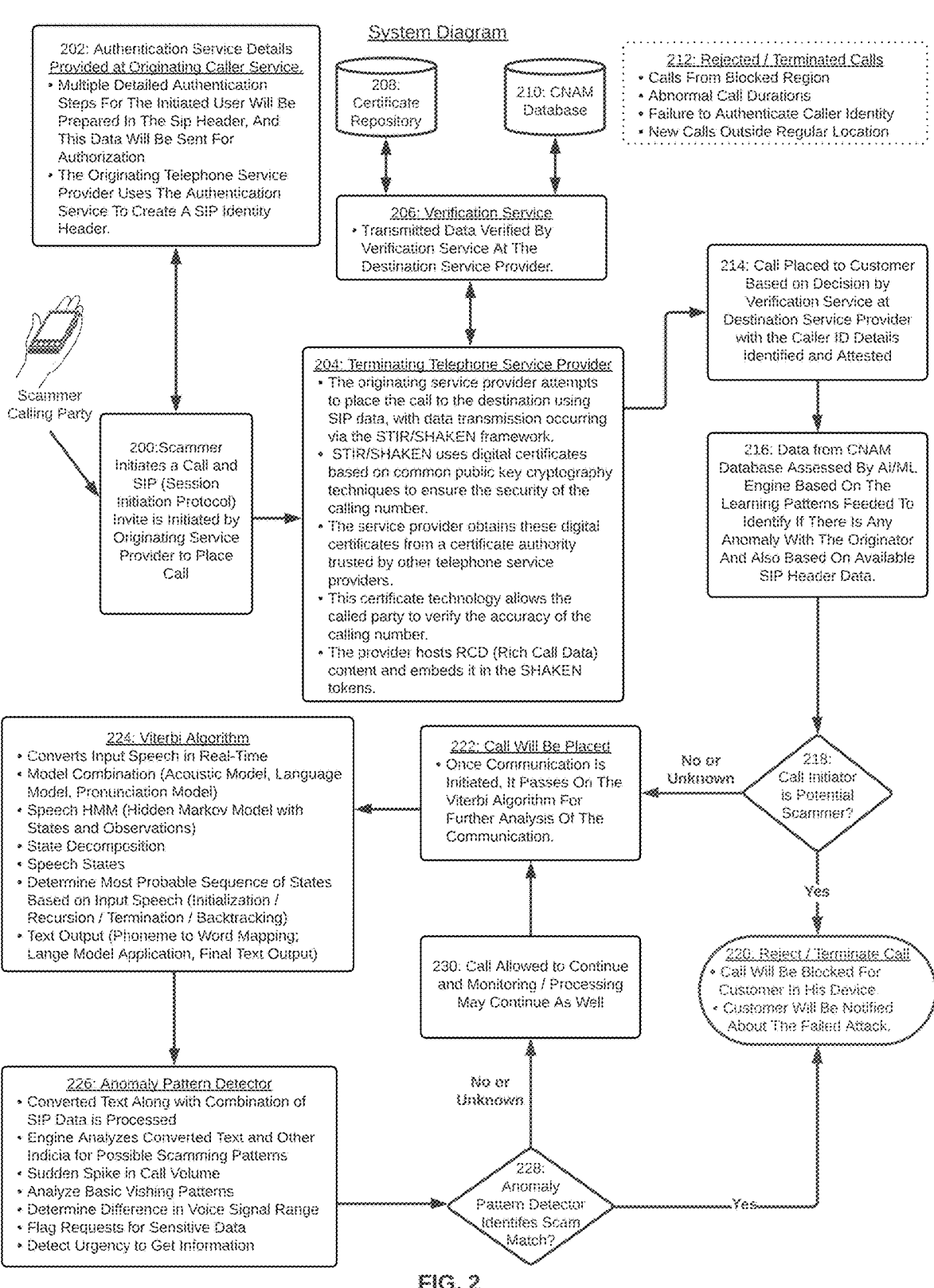

System Diagram

202: Authentication Service Details Provided at Originating Caller Service.
• Multiple Detailed Authentication Steps For The Initiated User Will Be Prepared In The Sip Header, And This Data Will Be Sent For Authorization
• The Originating Telephone Service Provider Uses The Authentication Service To Create A SIP Identity Header.

208: Certificate Repository

210: CNAM Database

212: Rejected / Terminated Calls
• Calls From Blocked Region
• Abnormal Call Durations
• Failure to Authenticate Caller Identity
• New Calls Outside Regular Location 206: Verification Service
• Transmitted Data Verified By Verification Service At The Destination Service Provider.

214: Call Placed to Customer Based on Decision by Verification Service at Destination Service Provider with the Caller ID Details Identified and Attested Scammer Calling Party 200: Scammer Initiates a Call and SIP (Session Initiation Protocol) Invite is Initiated by Originating Service Provider to Place Call 204: Terminating Telephone Service Provider
• The originating service provider attempts to place the call to the destination using SIP data, with data transmission occurring via the STIR/SHAKEN framework.
• STIR/SHAKEN uses digital certificates based on common public key cryptography techniques to ensure the security of the calling number.
• The service provider obtains these digital certificates from a certificate authority trusted by other telephone service providers.
• This certificate technology allows the called party to verify the accuracy of the calling number.
• The provider hosts RCD (Rich Call Data) content and embeds it in the SHAKEN tokens.

216: Data from CNAM Database Assessed By AI/ML Engine Based On The Learning Patterns Feeded To Identify If There Is Any Anomaly With The Originator And Also Based On Available SIP Header Data.

224: Viterbi Algorithm
• Converts Input Speech in Real-Time
• Model Combination (Acoustic Model, Language Model, Pronunciation Model)
• Speech HMM (Hidden Markov Model with States and Observations)
• State Decomposition
• Speech States
• Determine Most Probable Sequence of States Based on Input Speech (Initialization / Recursion / Termination / Backtracking)
• Text Output (Phoneme to Word Mapping; Lange Model Application, Final Text Output)

222: Call Will Be Placed
• Once Communication is Initiated, It Passes On The Viterbi Algorithm For Further Analysis Of The Communication.

No or Unknown

218: Call Initiator is Potential Scammer?

Yes

230. Call Allowed to Continue and Monitoring / Processing May Continue As Well

220. Reject / Terminate Call
• Call Will Be Blocked For Customer In His Device
• Customer Will Be Notified About The Failed Attack.

226: Anomaly Pattern Detector
• Converted Text Along with Combination of SIP Data is Processed
• Engine Analyzes Converted Text and Other Indicia for Possible Scamming Patterns
• Sudden Spike in Call Volume
• Analyze Basic Vishing Patterns
• Determine Difference in Voice Signal Range
• Flag Requests for Sensitive Data
• Detect Urgency to Get Information No or Unknown 228: Anomaly Pattern Detector Identifes Scam Match?

Yes

FIG. 2

Conceptual Flow Diagram

Class Diagram

INTELLIGENT TECHNICAL PROTOCOL BASED APPROACH LEVERAGING AI-ML TO BLOCK VISHING SCAMMERS

TECHNICAL FIELD

The invention pertains to information security, specifically focusing on the prevention and management of unauthorized data access and fraudulent activities through telecommunications systems, including systems and methods for protecting against the unauthorized access of data or resources and securing communication channels. This invention addresses these issues by utilizing an advanced artificial intelligence and machine learning framework to analyze and authenticate the identity and intentions of callers in real-time. By integrating with telecommunications technologies such as Session Initiation Protocol (SIP) and leveraging security protocols like STIR/SHAKEN for digital validation of call origins, the invention provides a robust solution to detect, prevent, and block voice phishing (vishing) attempts. This proactive approach ensures the security of sensitive personal and financial information against fraudulent activities conducted via phone calls, thereby enhancing the overall integrity and security of telecommunication practices.

DESCRIPTION OF THE RELATED ART

Vishing, or voice phishing, has become a significant threat in the digital era, particularly in the financial sector. This form of scam involves fraudsters posing as legitimate entities to extract sensitive information from unsuspecting victims over phone calls. These scammers are adept at attacking the anonymity afforded by telecommunications technologies, such as Voice over Internet Protocol (VoIP), to mask their true identities and locations. Their strategies often involve inducing a false sense of urgency or employing subtle threats, compelling individuals to divulge personal data, which can lead to significant financial losses and breaches of privacy.

The tactics used by vishing perpetrators have evolved to become highly sophisticated. They often begin their scams by establishing trust, using personal information sourced from the dark web or other illicit channels to sound convincing. By appearing credible, they manipulate victims into sharing confidential information like social security numbers, bank account details, and passwords. This information is then used for fraudulent activities, leading to financial attacks on the victims.

Current technological measures to combat vishing are insufficient. Traditional security systems and caller identification technologies often fail to detect or block these fraudulent calls effectively. This inadequacy leaves consumers vulnerable to scams, resulting in continuous financial losses and a significant breach of personal security. The limitations of existing solutions highlight the need for a more robust mechanism that can adapt to the evolving tactics of scammers.

One of the major challenges in tackling vishing is the use of VoIP systems by scammers, which allow them to make calls inexpensively from anywhere in the world, often completely bypassing conventional monitoring and tracking systems. These systems enable scammers to present any chosen phone number on the recipient's caller ID, making fraudulent calls appear as though they are coming from a trusted source such as a bank, a credit card company, or a government institution.

The complexity of the telecommunications infrastructure further complicates the issue. Calls can pass through multiple networks and service providers before reaching their final destination, making it difficult to trace the origin and verify the authenticity of a call. This lack of transparency in the call's provenance is a critical gap that scammers target to their advantage.

Moreover, the reactive nature of current anti-vishing systems means that they often only identify, and block known scam numbers after fraud has been reported. This method is inherently flawed as it fails to prevent the initial wave of scams from new or previously unreported numbers, thereby allowing significant damage before any protective action can be taken.

Another limitation is the lack of integration between different anti-fraud systems and telecommunications technologies. Current solutions do not adequately share information about emerging threats or suspicious patterns, which reduces the overall effectiveness of the anti-vishing measures. This lack of coordinated defense makes it easier for scammers to modify their strategies and continue targeting victims.

Furthermore, many existing systems rely heavily on user awareness and the ability to recognize fraudulent calls, which is not always feasible. Individuals vary greatly in their ability to detect scams, and fraudsters continuously refine their techniques to sound more convincing. This reliance on user vigilance places undue burden on the public and is not a sustainable or foolproof solution to the problem of vishing.

Finally, the long-felt need to address these vulnerabilities has led to a demand for a solution capable of proactively identifying and blocking fraudulent calls before they reach potential victims. Such a system would need to leverage advanced technologies to analyze and authenticate caller data in real-time, providing a robust defense against the increasingly sophisticated and varied techniques used by scammers. This approach would not only protect individuals from financial harm but also enhance the overall security of personal information in the digital landscape.

SUMMARY OF THE INVENTION

The invention effectively addresses the critical issue of vishing, a type of fraudulent activity where scammers use voice communication methods to deceive individuals into providing sensitive information, often resulting in financial losses. Vishing attacks can utilize both traditional phone lines and modern VOIP systems, and scammers typically employ techniques that create a sense of urgency or threat to manipulate victims into revealing confidential information. With the increasing sophistication of these attacks, including the use of pre-obtained personal information from sources such as the dark web, existing technologies have struggled to effectively counteract them. As a result, many customers remain vulnerable to such fraudulent activities.

To combat this issue, the invention integrates several advanced technologies and methodologies to create a robust system for detecting and preventing vishing attacks. The process begins when a call is initiated by a scammer or user. The call setup uses the Session Initiation Protocol (SIP), and a SIP invite is sent by the originating service provider. This initial step sets the stage for subsequent authentication and verification processes. Within this context, the SIP header is customized to include detailed authentication information about the caller. These details, prepared by the originating telephone service provider, enable verifying the caller's identity and ensuring the integrity of the communication.

Once the SIP invite is sent, the call data is transmitted using the STIR/SHAKEN framework. This framework employs digital certificates based on public key cryptography techniques to verify the authenticity of the calling number. The service provider obtains these digital certificates from a trusted certificate authority, ensuring that the calling number has not been spoofed. This step enables maintaining the security of the call and providing the recipient with confidence in the displayed caller ID. The STIR/SHAKEN framework's ability to digitally validate the handoff of phone calls across networks assists in preventing caller ID spoofing.

After the data transmission, the verification service at the destination service provider steps in to verify the transmitted data. This service checks the SIP Identity header, which contains a JSON web token (JWT) with sections for the header, payload, and signature. The JWT is base64 URL encoded, ensuring the secure transmission of authentication details. The verification process involves multiple steps, including decoding the payload to extract attestation details, origin and destination identifiers, and timestamps. Successful verification confirms the validity of the calling number, allowing the call to proceed.

The SIP data is also sent to a third-party database, which stores the information for further analysis. This database, typically a cloud-based application integrated with the telephone service provider, serves as a repository for the detailed authentication and verification data. The storage of this data enables subsequent steps in the detection and prevention process, particularly those involving advanced analysis by AI and ML engines. This third-party database ensures that all relevant data is available for real-time and post-call analysis.

With the verification complete, the call can be placed to the customer based on the verified caller ID details. At this point, the AI/ML engine begins its analysis of the SIP data. This engine utilizes machine learning algorithms to assess the data for any anomalies that might indicate a potential scam. The AI/ML engine is designed to consider various parameters, such as calls from blocked regions, abnormal call durations, and new calls from locations outside the regular pattern. This analysis identifies suspicious activity early in the call process.

If the AI/ML engine detects any anomalies that suggest the caller might be a scammer, the call is blocked, and the customer is immediately notified. This proactive approach helps prevent fraudulent interactions before they can cause harm. However, if the AI/ML engine is unable to conclusively determine the risk based on the SIP data alone, the call is allowed to proceed. In such cases, the call can undergo further (and continuous if desired) scrutiny using a Viterbi algorithm.

The Viterbi algorithm plays a key role in analyzing the real-time conversation between the caller and the recipient. This algorithm converts the spoken language into text, facilitating a detailed examination of the conversation. The Viterbi algorithm works by determining the most probable sequence of states given the sequence of observed acoustic features. It combines various models, including acoustic models, language models, and pronunciation models, to accurately transcribe and analyze the speech. This real-time conversion and analysis enable detection of any suspicious patterns in the conversation.

Once the speech is converted to text, the anomaly pattern detector processes the text along with the SIP data. This detector is another layer of the AI system designed to identify patterns indicative of vishing attacks. It looks for sudden spikes in call volume, typical vishing patterns, differences in voice signal ranges, and requests for sensitive information. The anomaly pattern detector's ability to flag these indicators helps in identifying and confirming vishing attempts.

If the anomaly pattern detector identifies a match with known vishing patterns, the call can be terminated immediately, and the customer can be informed of the potential fraud attempt. This final step ensures that even if a scammer manages to bypass the initial AI/ML engine checks, they are still caught and stopped by the real-time analysis and pattern detection processes. The integration of these technologies into a cohesive system provides a comprehensive solution to the problem of vishing, significantly enhancing the security of voice communications and protecting customers from fraud.

One of the features of this invention is the customization of the SIP header to include detailed authentication information. This allows the system to analyze the caller source details using the STIR/SHAKEN framework, which verifies the authenticity of the calling number. The inclusion of authentication details in the SIP header enhances the ability to detect and block fraudulent calls at an early stage.

For reference, STIR/SHAKEN is a framework designed to combat caller ID spoofing in phone calls, which is often used in vishing (voice phishing) attacks. STIR, or Secure Telephone Identity Revisited, is a set of protocols developed by the Internet Engineering Task Force (IETF) that provides a means for validating the identity of originating calls by using digital certificates. SHAKEN, or Signature-based Handling of Asserted information using toKENS, is a framework developed by the Alliance for Telecommunications Industry Solutions (ATIS) that defines how STIR protocols should be implemented by service providers. Together, STIR/SHAKEN authenticates the caller ID information by digitally signing the SIP (Session Initiation Protocol) invite with a digital certificate that verifies the caller's identity. It also verifies the authenticity of the caller ID at the receiving end, ensuring that the caller ID has not been spoofed and the call is legitimate. This framework helps in reducing fraudulent calls by ensuring that the calling number displayed is the actual number of the caller, thereby enhancing trust in voice communications.

Another inventive feature is the use of a third-party database to store SIP data. This database serves as a repository for the authentication and verification data, enabling the AI/ML engine to access and analyze the data in real-time. The third-party database also allows for post-call analysis, ensuring that any anomalies detected during the call can be investigated further.

The AI/ML engine is a critical component of the invention, utilizing machine learning algorithms to analyze the SIP data for any anomalies. This engine considers various parameters, such as calls from blocked regions, abnormal call durations, and new calls from unusual locations, to identify potential scams. The self-learning nature of the AI/ML engine ensures that it continually improves its ability to detect fraudulent calls.

The Viterbi algorithm is another core feature of the invention, providing real-time analysis of the conversation between the caller and the recipient. By converting speech to text and analyzing the sequence of states, the Viterbi algorithm can detect suspicious patterns in the conversation. This analysis is crucial for identifying vishing attempts that may not be evident from the SIP data alone.

The anomaly pattern detector adds another layer of security by analyzing the converted text and SIP data for known vishing patterns. This detector can identify indicators such as sudden spikes in call volume, typical vishing patterns, and requests for sensitive information. By flagging these indicators, the anomaly pattern detector helps confirm the presence of a vishing attack.

The integration of these and other core features into a single system provides a comprehensive solution to the problem of vishing. By utilizing advanced technologies such as SIP header customization, third-party databases, AI/ML engines, the Viterbi algorithm, and anomaly pattern detectors, the invention offers robust protection against fraudulent voice communications. This system not only enhances the security of voice communications but also provides peace of mind to customers, knowing that their calls are being monitored and protected from potential scams.

In various technical implementations of the solutions disclosed herein, the process starts with call initiation where the SIP invite includes detailed authentication in the header, which is processed through the STIR/SHAKEN framework. The verification service then checks the JWT in the SIP header, ensuring the calling number's authenticity. The SIP data is stored in a third-party database for real-time and post-call analysis. The AI/ML engine analyzes this data for anomalies, blocking the call if potential fraud is detected. If the call proceeds, the Viterbi algorithm converts speech to text in real-time, with the text being analyzed by the anomaly pattern detector for vishing patterns. Upon detecting such patterns, the call is terminated and the customer is notified.

The detailed authentication in the SIP header allows the system to perform an initial analysis of the caller's details, enhancing the detection of fraudulent calls early in the process. The integration of the third-party database ensures that all relevant data is available for thorough analysis, both during and after the call. The AI/ML engine's ability to continuously learn and improve its detection capabilities is a key component, making the system more effective over time. The Viterbi algorithm's real-time conversion of speech to text allows for immediate analysis of the conversation, ensuring that any suspicious activity can be detected and acted upon swiftly. The anomaly pattern detector's role in identifying known vishing patterns adds an additional layer of security, making it difficult for scammers to succeed. The comprehensive integration of these technologies provides a robust solution to vishing, protecting customers and enhancing the security of voice communications.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In some arrangements, an information-security method for detecting and preventing vishing attacks comprises the steps of initiating a call and sending a Session Initiation Protocol (SIP) invite from an originating service provider, wherein the SIP invite includes detailed authentication information in the SIP header. The method includes transmitting the call data using the STIR/SHAKEN framework, which employs digital certificates to verify the authenticity of the calling number. The SIP data is received at a destination service provider and the transmitted data is verified using a verification service, which decodes the SIP Identity header containing a JSON web token (JWT) with attestation details. The verified SIP data is stored in a third-party database for further analysis. The SIP data is analyzed using an artificial intelligence and machine learning (AI/ML) engine to detect anomalies, such as calls from blocked regions, abnormal call durations, and new calls from unusual locations. If the AI/ML engine detects potential fraud, the call is blocked and the customer is notified. If the AI/ML engine is indecisive, the call is allowed to proceed and real-time speech analysis is performed using the Viterbi algorithm, which converts the spoken language into text. The converted text along with the SIP data is processed using an anomaly pattern detector to identify vishing patterns, such as sudden spikes in call volume, typical vishing patterns, differences in voice signal ranges, and requests for sensitive information. If the anomaly pattern detector identifies a match with known vishing patterns, the call is terminated, and the customer is informed. The method also includes continuing to monitor and process the call if no suspicious patterns are detected, ensuring ongoing security.

In some arrangements, an information-security method for detecting and preventing vishing attacks comprises the steps of initiating a call and sending a Session Initiation Protocol (SIP) invite from an originating service provider, wherein the SIP invite includes detailed authentication information in the SIP header, such as caller identity, caller location, and call initiation timestamp. The method includes transmitting the call data using the STIR/SHAKEN framework, which employs digital certificates to verify the authenticity of the calling number, ensuring that the caller ID has not been spoofed. The SIP data is received at a destination service provider and the transmitted data is verified using a verification service, which decodes the SIP Identity header containing a JSON web token (JWT) with attestation details, origin and destination identifiers, and timestamps, to confirm the validity of the calling number.

The verified data is cross-referenced with a Caller Name (CNAM) database to retrieve additional caller identification information. The verified SIP data and CNAM information are stored in a third-party database for further analysis, ensuring that all authentication and verification details are available for subsequent processing. The SIP data and CNAM information are analyzed using an artificial intelligence and machine learning (AI/ML) engine to detect anomalies, such as calls from blocked regions, abnormal call durations, and new calls from unusual locations, by comparing the SIP data against known patterns of legitimate and fraudulent calls. If the AI/ML engine detects potential fraud based on the analysis of the SIP data and CNAM information, the call is blocked and the customer is notified, preventing the fraudulent call from reaching the customer.

If the AI/ML engine is indecisive, the call is allowed to proceed and real-time speech analysis is performed using the Viterbi algorithm, which converts the spoken language into text by determining the most probable sequence of states given the sequence of observed acoustic features, including phonemes and words. The converted text along with the SIP data and CNAM information is processed using an anomaly pattern detector to identify vishing patterns, such as sudden spikes in call volume, typical vishing patterns, differences in voice signal ranges, and requests for sensitive information, by analyzing both the linguistic content and the call metadata.

If the anomaly pattern detector identifies a match with known vishing patterns, the call is terminated and the customer is informed, thereby preventing the continuation of the fraudulent call and alerting the customer to the attempted scam. The method also includes continuing to monitor and process the call if no suspicious patterns are detected, ensuring ongoing security by periodically re-evaluating the call data and updating the AI/ML engine with new information to adapt to evolving vishing tactics.

In some arrangements, the detailed authentication information in the SIP header includes full attestation, partial attestation, or gateway attestation based on the level of verification performed on the caller's identity, with full attestation indicating the highest level of confidence in the caller's authenticity.

In some arrangements, the STIR/SHAKEN framework uses public key cryptography to generate the digital certificates that are used to verify the authenticity of the calling number, ensuring that the calling number cannot be easily spoofed by malicious actors.

In some arrangements, the verification service at the destination service provider utilizes a certificate repository to validate the digital certificates included in the SIP Identity header, comparing the certificates against trusted sources to ensure their validity.

In some arrangements, the third-party database is a cloud-based application integrated with the telephone service provider to store detailed authentication and verification data for real-time and post-call analysis, enabling continuous monitoring and rapid response to detected anomalies.

In some arrangements, the AI/ML engine continuously learns from new data and evolving threat patterns to improve its accuracy in detecting anomalies, incorporating feedback from previously detected fraudulent calls to enhance its predictive capabilities.

In some arrangements, the Viterbi algorithm integrates acoustic models, language models, and pronunciation models to accurately transcribe and analyze the speech in real-time, providing a detailed linguistic analysis that helps identify suspicious conversational patterns.

In some arrangements, the anomaly pattern detector uses machine learning techniques to recognize known vishing patterns based on the converted text and SIP data, identifying specific indicators of fraudulent activity such as urgent requests for personal information or inconsistencies in the caller's speech.

In some arrangements, the customer is notified of the potential fraud attempt through an alert message sent to their device upon call termination, including details of the detected threat and recommendations for further actions to protect their information.

In some arrangements, the continuous monitoring and processing of the call involve periodic re-analysis of the call data to ensure ongoing security against vishing attacks, updating the AI/ML engine with the latest threat intelligence and adapting to new scam tactics as they emerge.

In some arrangements, an information-security system for detecting and preventing vishing attacks comprises an originating service provider configured to initiate a call and send a Session Initiation Protocol (SIP) invite, wherein the SIP invite includes detailed authentication information in the SIP header, such as caller identity, caller location, and call initiation timestamp. The system includes a STIR/SHAKEN framework integrated with the originating service provider, configured to transmit the call data and employ digital certificates to verify the authenticity of the calling number, ensuring that the caller ID has not been spoofed.

A destination service provider is configured to receive the SIP data and verify the transmitted data using a verification service, wherein the verification service decodes the SIP Identity header containing a JSON web token (JWT) with attestation details, origin and destination identifiers, and timestamps to confirm the validity of the calling number. A Caller Name (CNAM) database is configured to cross-reference the verified data and retrieve additional caller identification information. The system further includes a third-party database integrated with the destination service provider, configured to store the verified SIP data and CNAM information for further analysis.

An artificial intelligence and machine learning (AI/ML) engine is configured to analyze the SIP data and CNAM information to detect anomalies, such as calls from blocked regions, abnormal call durations, and new calls from unusual locations, by comparing the SIP data against known patterns of legitimate and fraudulent calls. A call blocking module is integrated with the AI/ML engine, configured to block the call and notify the customer if the AI/ML engine detects potential fraud based on the analysis of the SIP data and CNAM information. A speech analysis module is configured to allow the call to proceed if the AI/ML engine is indecisive, and perform real-time speech analysis using the Viterbi algorithm, which converts the spoken language into text by determining the most probable sequence of states given the sequence of observed acoustic features, including phonemes and words.

An anomaly pattern detector is integrated with the speech analysis module, configured to process the converted text along with the SIP data and CNAM information to identify vishing patterns, such as sudden spikes in call volume, typical vishing patterns, differences in voice signal ranges, and requests for sensitive information, by analyzing both the linguistic content and the call metadata.

A call termination module is configured to terminate the call and inform the customer if the anomaly pattern detector identifies a match with known vishing patterns, thereby preventing the continuation of the fraudulent call and alerting the customer to the attempted scam. A continuous monitoring module is configured to monitor and process the call if no suspicious patterns are detected, ensuring ongoing security by periodically re-evaluating the call data and updating the AI/ML engine with new information to adapt to evolving vishing tactics.

In some arrangements, the detailed authentication information in the SIP header includes full attestation, partial attestation, or gateway attestation based on the level of verification performed on the caller's identity, with full attestation indicating the highest level of confidence in the caller's authenticity.

In some arrangements, the STIR/SHAKEN framework uses public key cryptography to generate the digital certificates that are used to verify the authenticity of the calling number, ensuring that the calling number cannot be easily spoofed by malicious actors.

In some arrangements, the verification service at the destination service provider utilizes a certificate repository to validate the digital certificates included in the SIP Identity header, comparing the certificates against trusted sources to ensure their validity.

In some arrangements, the third-party database is a cloud-based application integrated with the telephone service provider to store detailed authentication and verification data for real-time and post-call analysis, enabling continuous monitoring and rapid response to detected anomalies.

In some arrangements, the AI/ML engine continuously learns from new data and evolving threat patterns to improve its accuracy in detecting anomalies, incorporating feedback from previously detected fraudulent calls to enhance its predictive capabilities.

In some arrangements, the Viterbi algorithm integrates acoustic models, language models, and pronunciation models to accurately transcribe and analyze the speech in real-time, providing a detailed linguistic analysis that helps identify suspicious conversational patterns.

In some arrangements, the anomaly pattern detector uses machine learning techniques to recognize known vishing patterns based on the converted text and SIP data, identifying specific indicators of fraudulent activity such as urgent requests for personal information or inconsistencies in the caller's speech.

In some arrangements, the customer is notified of the potential fraud attempt through an alert message sent to their device upon call termination, including details of the detected threat and recommendations for further actions to protect their information.

In some arrangements, the continuous monitoring and processing of the call involve periodic re-analysis of the call data to ensure ongoing security against vishing attacks, updating the AI/ML engine with the latest threat intelligence and adapting to new scam tactics as they emerge.

The following description and claims, in conjunction with the drawings—all integral parts of this specification—will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 2 is a sample system diagram that depicts the interactions between the scammer, originating and terminating service providers, and the verification and AI/ML systems, showing the flow of data and the decision-making process involved in detecting and blocking vishing attempts.

It emphasizes the roles of the SIP identity header, digital certificates, and anomaly pattern detection in ensuring call security and authenticity.

Figure 3:
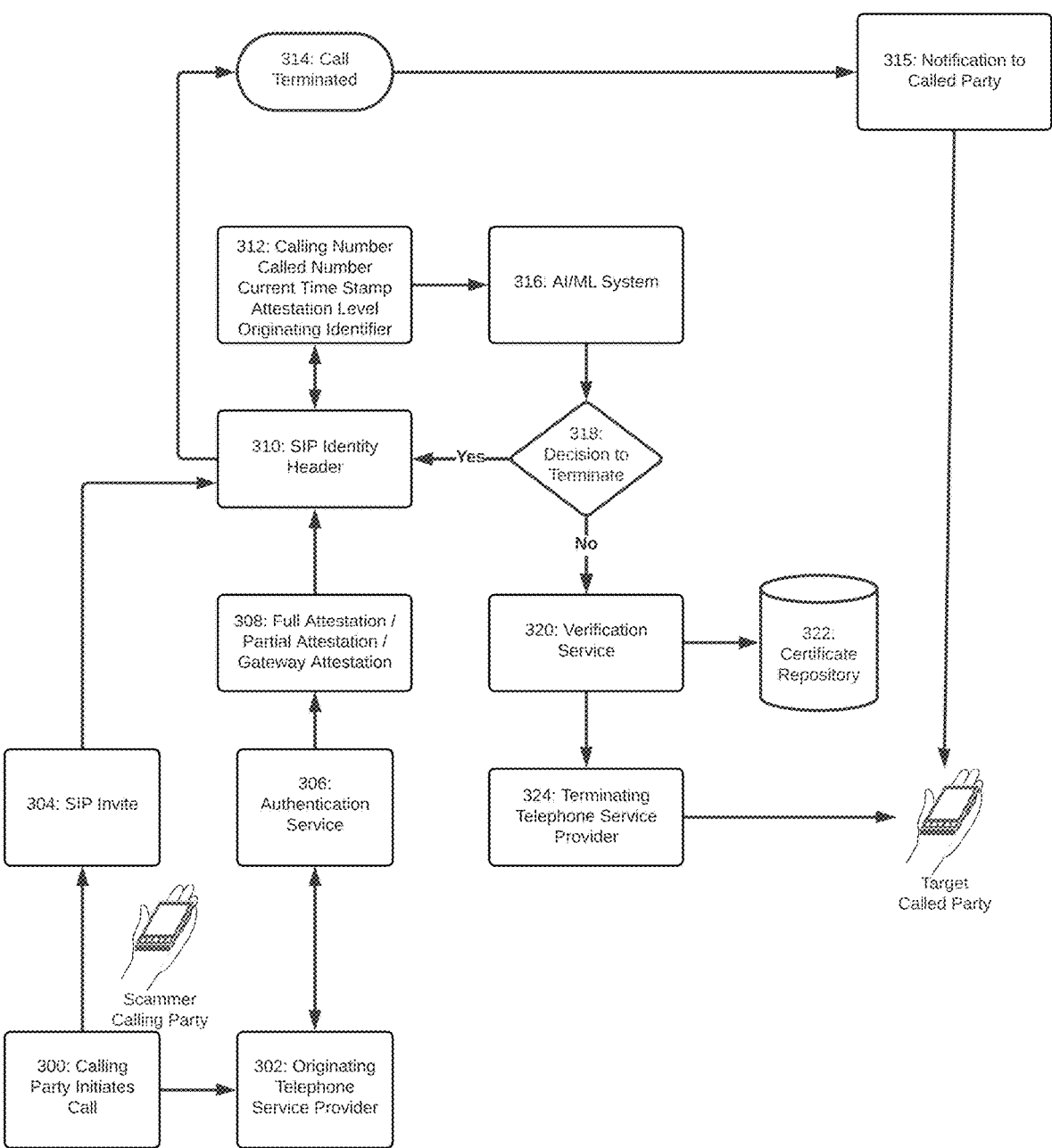

FIG. 3 is a sample, conceptual, flow diagram that outlines the step-by-step procedure for handling a call from initiation to termination, including the generation of the SIP invite, various levels of authentication, real-time analysis using the Viterbi algorithm, and final decision-making based on anomaly detection. It illustrates the continuous monitoring and verification processes that safeguard against vishing attacks.

Figure 4:
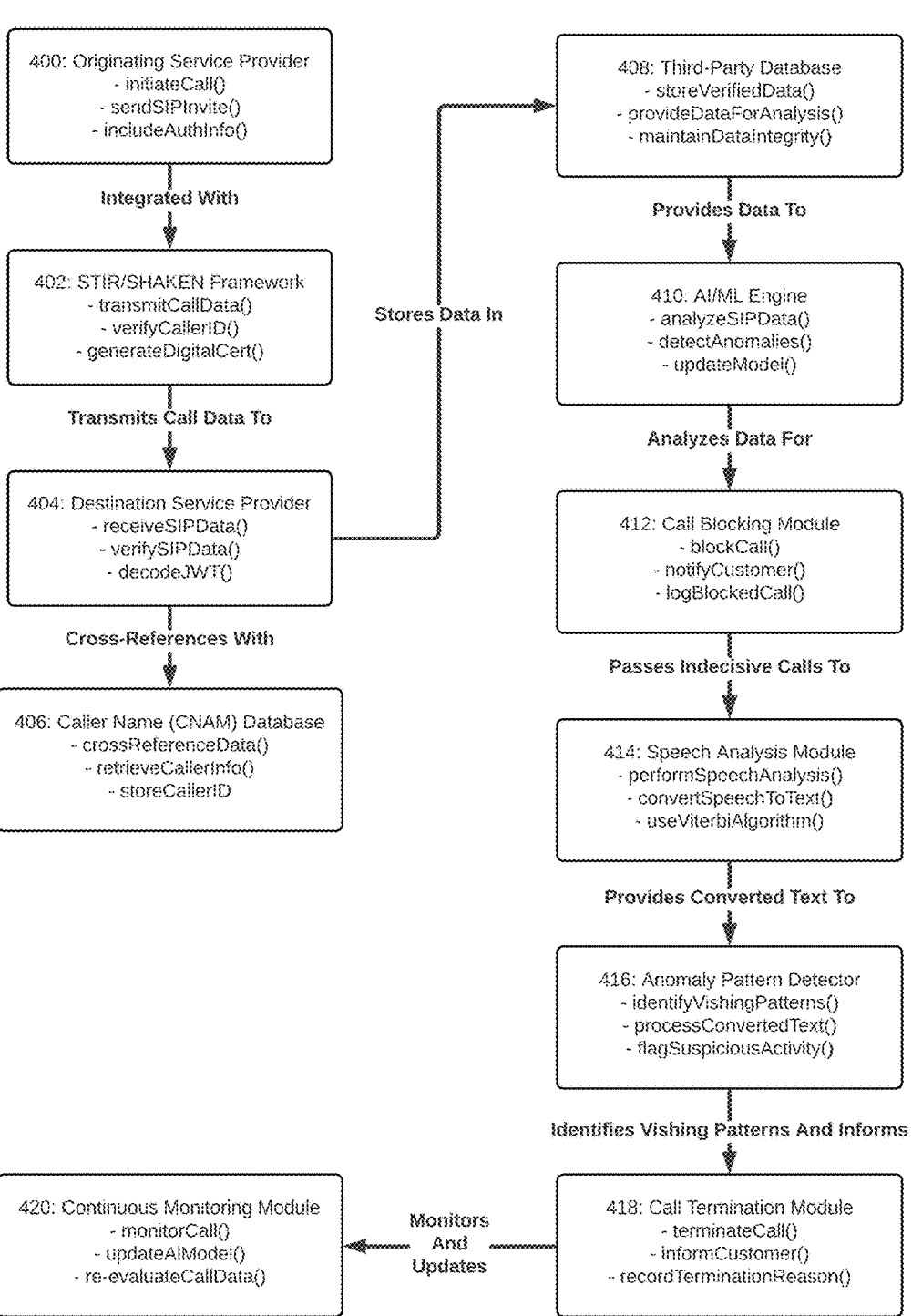

FIG. 4 is a sample class diagram that illustrates an information-security system for detecting and preventing vishing attacks, detailing its components, functions, and interactions. Each class represents a part of the system, such as service providers, databases, and analysis modules, highlighting their roles in verifying, analyzing, and responding to potential vishing threats.

Figure 5:
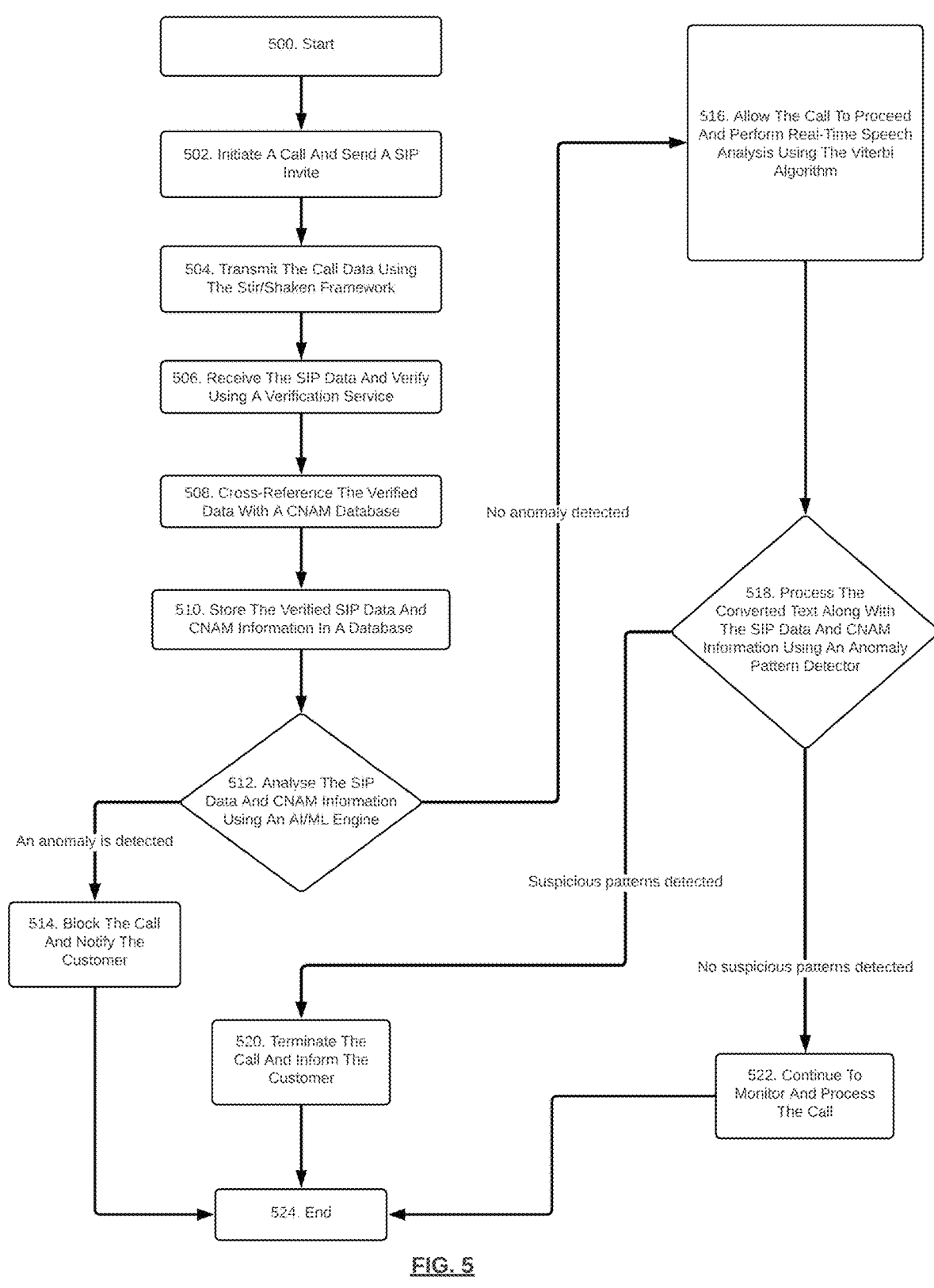

FIG. 5 illustrates a sample information-security method for detecting and preventing vishing attacks, detailing steps such as initiating a call, verifying caller identity using the STIR/SHAKEN framework, and analyzing call data with AI/ML to detect and block potential fraud. The method includes real-time speech analysis and continuous monitoring to adapt to evolving vishing tactics.

DETAILED DESCRIPTION

At a high level, the system and method inventions disclosed herein offer comprehensive solutions to vishing, a type of fraud where scammers use voice communications to extract sensitive information. It leverages advanced technologies and methodologies to detect and prevent such attacks effectively. At its core, the inventions integrate detailed SIP header customization, the STIR/SHAKEN framework, third-party databases, AI/ML engines, and the Viterbi algorithm.

The system begins by customizing the SIP header to include detailed authentication information about the caller, which is crucial for the verification process. This data is then transmitted using the STIR/SHAKEN framework, which utilizes digital certificates to ensure the authenticity of the calling number, thereby preventing caller ID spoofing. Once the call data is transmitted, the verification service at the destination provider checks the SIP Identity header, which contains a JSON web token (JWT) with encoded authentication details. This ensures the legitimacy of the call.

The SIP data is also sent to a third-party database, typically a cloud-based application integrated with the telephone service provider, for further analysis. This database serves as a repository for the detailed authentication and verification data, enabling the AI/ML engine to access and analyze the data in real-time. The AI/ML engine utilizes machine learning algorithms to assess the SIP data for any anomalies that might indicate a potential scam, considering various parameters such as calls from blocked regions, abnormal call durations, and new calls from unusual locations. If the AI/ML engine detects any anomalies suggesting that the caller might be a scammer, the call is blocked, and the customer is immediately notified. This proactive approach helps prevent fraudulent interactions before they can cause harm.

However, if the AI/ML engine is unable to conclusively determine the risk based on the SIP data alone, the call is allowed to proceed, undergoing further scrutiny using the Viterbi algorithm. The Viterbi algorithm plays a key role in analyzing the real-time conversation between the caller and the recipient. This algorithm converts the spoken language into text, facilitating a detailed examination of the conversation by determining the most probable sequence of states given the sequence of observed acoustic features. It combines various models, including acoustic models, language models, and pronunciation models, to accurately transcribe and analyze the speech.

Once the speech is converted to text, the anomaly pattern detector processes the text along with the SIP data. This detector is another layer of the AI system, designed to identify patterns indicative of vishing attacks by looking for sudden spikes in call volume, typical vishing patterns, differences in voice signal ranges, and requests for sensitive information. If the anomaly pattern detector identifies a match with known vishing patterns, the call is terminated immediately, and the customer is informed of the potential fraud attempt. This final step ensures that even if a scammer manages to bypass the initial AI/ML engine checks, they are still caught and stopped by the real-time analysis and pattern detection processes.

The integration of these technologies into a cohesive system provides a comprehensive solution to the problem of vishing, significantly enhancing the security of voice communications and protecting customers from fraud. The system not only enhances the security of voice communications but also provides peace of mind to customers, knowing that their calls are being monitored and protected from potential scams. This multi-layered approach, combining SIP customization, robust frameworks, real-time analysis, and continuous learning, provides a powerful defense against vishing, ensuring that fraudulent activities are detected and mitigated swiftly.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

Terms such as "computers," "machines," and similar phrases are used interchangeably based on the context to denote devices that may be general-purpose or specialized for specific functions, whether virtual or physical, and capable of network connectivity. This encompasses all pertinent hardware, software, and components known to those skilled in the field. Such devices might feature specialized circuits like application-specific integrated circuits (ASICs), microprocessors, cores, or other processing units for executing, accessing, controlling, or implementing various types of software, instructions, data, modules, processes, or routines. The employment of these terms within this document is not intended to restrict or exclusively refer to any specific type of electronic devices or components, and should be interpreted broadly by those with relevant expertise. For conciseness and assuming familiarity, detailed descriptions of computer/software components and machines are omitted.

Software, executable code, data, modules, procedures, and similar entities may reside on tangible, physical computer-readable storage devices. This includes a range from local memory to network-attached storage, and various other accessible memory types, whether removable, remote, cloud-based, or accessible through other means. These elements can be stored in both volatile and non-volatile memory forms and may operate under different conditions such as autonomously, on-demand, as per a preset schedule, spontaneously, proactively, or in response to certain triggers. They may be consolidated or distributed across multiple computers or devices, integrating their memory and other components. These elements can also be located or dispersed across network-accessible storage systems, within distributed databases, big data infrastructures, blockchains, or distributed ledger technologies, whether collectively or in distributed configurations.

The term "networks" and similar references encompass a wide array of communication systems, including local area networks (LANs), wide area networks (WANs), the Internet, cloud-based networks, and both wired and wireless configurations. This category also covers specialized networks such as digital subscriber line (DSL) networks, frame relay networks, asynchronous transfer mode (ATM) networks, and virtual private networks (VPN), which may be interconnected in various configurations. Networks are equipped with specific interfaces to facilitate diverse types of communications—internal, external, and administrative—and have the ability to assign virtual IP addresses (VIPs) as needed. Network architecture involves a suite of hardware and software components, including but not limited to access points, network adapters, buses, both wired and wireless ethernet adapters, firewalls, hubs, modems, routers, and switches, which may be situated within the network, on its edge, or externally. Software and executable instructions operate on these components to facilitate network functions. Moreover, networks support HTTPS and numerous other communication protocols, enabling them to handle packet-based data transmission and communications effectively.

As used herein, Generative Artificial Intelligence (AI) or the like refers to AI techniques that learn from a representation of training data and use it to generate new content similar to or inspired by existing data. Generated content may include human-like outputs such as natural language text, source code, images/videos, and audio samples. Generative AI solutions typically leverage open-source or vendor sourced (proprietary) models, and can be provisioned in many ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used under various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models-Meta LLAMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in biology and medicine. (5) NVIDIA AI Models-Megatron: A large, powerful transformer model designed for natural language processing tasks. (6) IBM AI Models-Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in generative AI. One or more of the foregoing may be used herein as desired. All are considered within the sphere and scope of this disclosure.

Generative AI and LLMs can be used in various parts of this disclosure performing one or more various tasks, as desired, including: (1) Natural Language Processing (NLP): This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and using large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

Figure 1:
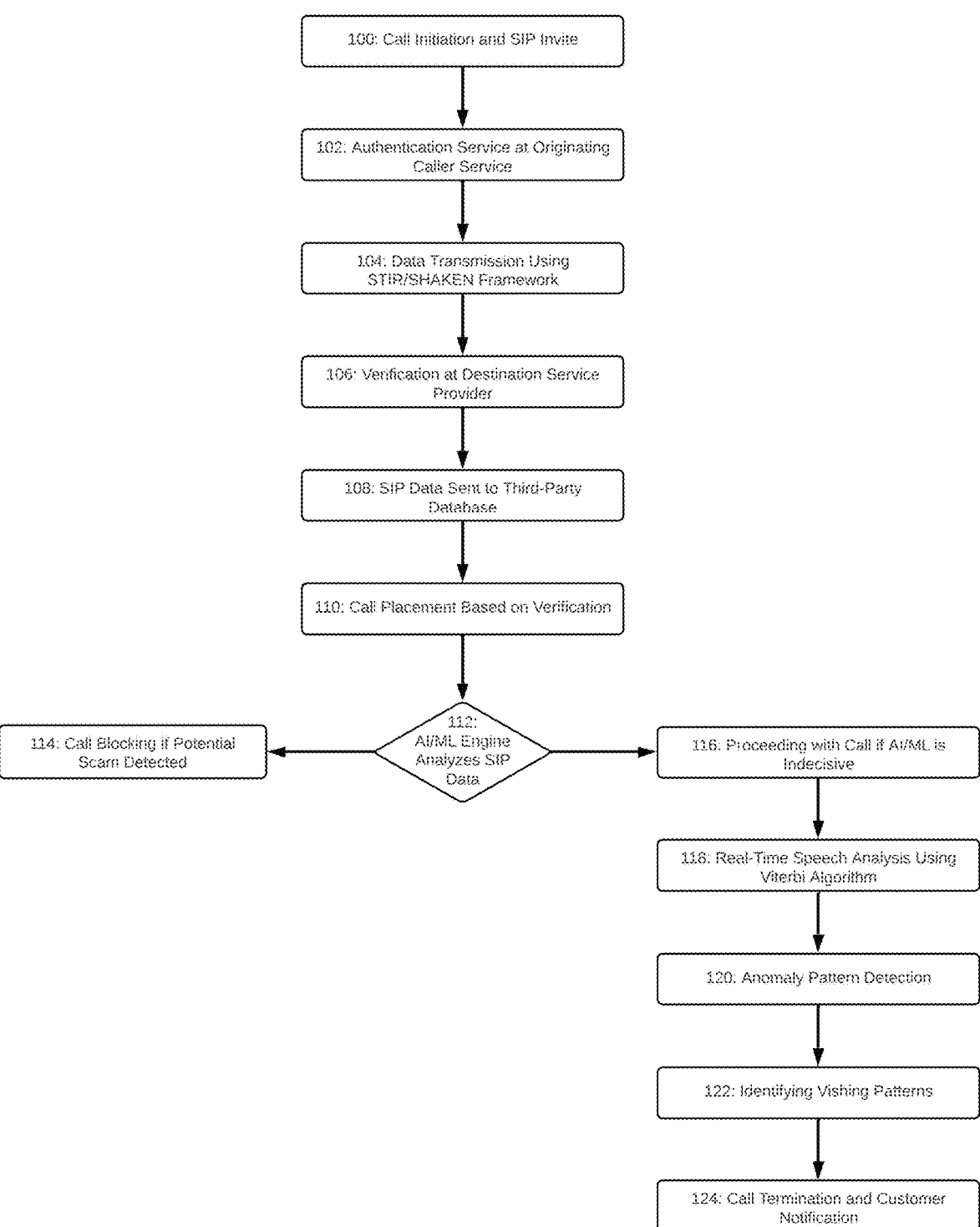
FIG. 1 illustrates a sample, technical, process flow for detecting and preventing vishing attacks, starting from call initiation and SIP invite, progressing through various stages of authentication, verification, AI/ML analysis, and real-time speech analysis, and ending with call termination and customer notification if a potential scam is detected. It highlights the integration of the STIR/SHAKEN framework, third-party database, and Viterbi algorithm in the system.

FIG. 1 provides a detailed and comprehensive technical process flow designed to detect and prevent vishing attacks, showcasing how various advanced technologies are integrated to secure voice communications. Each step in this process is meticulously outlined to demonstrate the robustness of the system in ensuring the authenticity and security of calls.

The process begins with Call Initiation and SIP Invite (100), where the system first handles the initiation of a call by either a legitimate user or a scammer. The originating service provider sends a Session Initiation Protocol (SIP) invite, which is crucial for setting up the call. The SIP invite acts as the initial handshake, containing the necessary details to start the communication process.

Following the initiation, the process moves to Authentication Service at Originating Caller Service (102). In this step, the originating telephone service provider includes detailed authentication information in the SIP header. This information verifies the caller's identity and ensures the integrity of the communication. The authentication details can involve multiple levels of verification, such as partial, full, or gateway authentication, tailored to the caller and the call type. These details are prepared meticulously to ensure they provide a robust basis for the subsequent verification process.

The next step involves Data Transmission Using STIR/SHAKEN Framework (104). The STIR (Secure Telephone Identity Revisited) and SHAKEN (Signature-based Handling of Asserted Information Using toKENs) frameworks are employed to transmit the call data securely. These frameworks utilize digital certificates based on public key cryptography to verify the calling number's authenticity. The service provider obtains these certificates from a trusted certificate authority, which ensures that the calling number has not been spoofed. This process maintains the security of the call and provides confidence to the recipient in the displayed caller ID. The digital certificates assist in preventing caller ID spoofing, which is a common tactic used in vishing attacks.

Once the data is transmitted, the system proceeds to Verification at Destination Service Provider (106). Here, the destination service provider receives the SIP data and verifies the transmitted information. The verification service examines the SIP Identity header, which includes a JSON web token (JWT) comprising the header, payload, and signature sections. The JWT is base64 URL encoded, ensuring secure transmission of authentication details. During verification, the payload is decoded to extract attestation details, origin and destination identifiers, and timestamps. This thorough verification process confirms the calling number's validity, allowing the call to proceed if deemed legitimate.

The SIP data is then sent to a Third-Party Database (108) for storage and further analysis. This third-party database, typically a cloud-based application integrated with the telephone service provider, acts as a repository for the detailed authentication and verification data. Storing this data enables subsequent steps in the detection and prevention process, particularly those involving advanced AI and ML analysis. The third-party database ensures that relevant data is readily available for real-time and post-call analysis, facilitating continuous improvement and adaptation of the system to emerging threats.

With verification complete, the system moves to Call Placement Based on Verification (110). If the verification confirms the caller ID details, the call is placed to the customer. This step marks the transition from initial verification to real-time analysis, where the AI/ML engine takes over to scrutinize the call data further.

The AI/ML Engine Analyzes SIP Data (112) is a critical component of the system. The AI/ML engine employs sophisticated machine learning algorithms to assess the SIP data for any anomalies that might indicate a potential scam. The engine considers various parameters, such as calls originating from blocked regions, abnormal call durations, and new calls from locations outside the usual pattern. This analysis is crucial for identifying suspicious activity early in the call process. The AI/ML engine is designed to be self-learning, meaning it continuously improves its detection capabilities based on new data and evolving threat patterns, ensuring the system remains effective against emerging vishing techniques.

If the AI/ML engine detects any anomalies suggesting that the caller might be a scammer, the process advances to Call Blocking if Potential Scam Detected (114). In this step, the call is blocked on the customer's device, and the customer is immediately notified of the attempted scam. This proactive approach helps prevent fraudulent interactions before they can cause any harm, effectively stopping the scammer in their tracks and protecting the customer from potential financial or personal information theft.

However, if the AI/ML engine is unable to conclusively determine the risk based on the SIP data alone, the call proceeds to the next level of scrutiny, Proceeding with Call if AI/ML is Indecisive (116). Here, the call is allowed to continue, but it undergoes further examination using the Viterbi algorithm for real-time analysis.

Real-Time Speech Analysis Using Viterbi Algorithm (118) is an advanced step where the Viterbi algorithm converts the spoken language into text for detailed examination of the conversation. By determining the most probable sequence of states given the sequence of observed acoustic features, the Viterbi algorithm accurately transcribes and analyzes the speech. It integrates various models, including acoustic models, language models, and pronunciation models, to ensure precise and comprehensive analysis. This real-time conversion and analysis are essential for detecting any suspicious patterns in the conversation that might not be evident from the SIP data alone.

Once the speech is converted to text, the process moves to Anomaly Pattern Detection (120). The converted text, along with the SIP data, is processed by an anomaly pattern detector. This detector represents another layer of the AI system designed to identify patterns indicative of vishing attacks. It scrutinizes the data for sudden spikes in call volume, typical vishing patterns, differences in voice signal ranges, and requests for sensitive information. The anomaly pattern detector's ability to flag these indicators helps in identifying and confirming vishing attempts with high accuracy.

If the anomaly pattern detector identifies a match with known vishing patterns, the system progresses to Identifying Vishing Patterns (122), where the presence of a vishing attack is confirmed. This leads to the final step, Call Termination and Customer Notification (124). In this step, the call is terminated immediately, stopping the communication between the scammer and the customer. The customer is informed of the potential fraud attempt, ensuring they are aware of the threat and can take any necessary actions to protect themselves further.

Overall, FIG. 1 illustrates a comprehensive, multi-layered approach to securing voice communications and protecting customers from vishing attacks. By integrating detailed SIP header customization, the robust STIR/SHAKEN framework, third-party databases for data storage, sophisticated AI/ML engines for anomaly detection, the Viterbi algorithm for real-time speech analysis, and anomaly pattern detectors, the system provides a powerful defense against fraudulent calls. This thorough and proactive approach ensures that every aspect of the call, from initiation to termination, is scrutinized and verified, significantly enhancing the security and reliability of voice communications. The integration of these technologies into a cohesive system not only protects customers from vishing attacks but also instills confidence in the overall security of their voice communications.

FIG. 2 provides a sample system diagram that outlines the intricate interactions and processes involved in detecting and preventing vishing attacks. This figure meticulously details how different entities and technologies collaborate to ensure call security and authenticity, integrating multiple layers of verification, real-time analysis, and machine learning to protect against fraudulent activities.

The process initiates with the Scammer Initiates a Call and SIP (Session Initiation Protocol) Invite is Initiated by Originating Service Provider to Place Call (200). Here, the scammer, acting as the calling party, initiates a call. The originating service provider sends a SIP invite, which is a crucial step for setting up the call. This invite includes the necessary details to start the communication process and sets the foundation for subsequent authentication and verification steps. In other words, the scammer initiates a call, and a SIP (Session Initiation Protocol) invite is sent by the originating service provider to place the call.

At Authentication Service Details Provided at Originating Caller Service (202), multiple detailed authentication steps for the initiated user are prepared in the SIP header. These authentication details are critical for verifying the caller's identity and ensuring the integrity of the communication. The originating telephone service provider utilizes this authentication service to create a SIP Identity header, which includes information such as the caller's identity and other relevant authentication data. This header ensures that the call setup carries enough data to validate the caller's legitimacy in the next stages of verification. Thus, multiple detailed authentication steps for the initiating user will be included in the SIP header, and this data will be sent for authorization. The originating telephone service provider uses the authentication service to create a SIP Identity header.

The next stage involves the Terminating Telephone Service Provider (204). Here, the originating service provider attempts to place the call to the destination using the SIP data. The data transmission occurs via the STIR/SHAKEN framework. STIR (Secure Telephone Identity Revisited) and SHAKEN (Signature-based Handling of Asserted Information Using toKENs) are frameworks that employ digital certificates based on public key cryptography techniques to verify the calling number's authenticity. The originating service provider obtains these digital certificates from a trusted certificate authority, ensuring the calling number has not been spoofed. This step is vital for maintaining the call's security and providing confidence to the recipient regarding the displayed caller ID. The digital certificates play a crucial role in preventing caller ID spoofing, a common tactic in vishing attacks. Additionally, the provider hosts Rich Call Data (RCD) content and embeds it in the SHAKEN tokens, which enhances the call's authenticity by including more detailed caller information.

Stated differently, in 204, the originating service provider attempts to place the call to the destination using SIP data, with data transmission occurring via the STIR/SHAKEN framework. STIR/SHAKEN uses digital certificates based on common public key cryptography techniques to ensure the security of the calling number. The service provider obtains these digital certificates from a certificate authority trusted by other telephone service providers. This certificate technology allows the called party to verify the accuracy of the calling number. The provider hosts Rich Call Data (RCD) content and embeds it in the SHAKEN tokens.

The Verification Service (206) then steps in to verify the transmitted data. The verification service at the destination service provider checks the SIP Identity header, which contains a JSON web token (JWT) with the header, payload, and signature sections. The JWT is base64 URL encoded to ensure secure transmission. The verification process involves decoding the payload to extract attestation details, origin and destination identifiers, and timestamps. Successful verification confirms the calling number's validity, allowing the call to proceed further in the process.

The verified data is cross-referenced with information from the Certificate Repository (208) and the CNAM Database (210). The certificate repository stores the digital certificates required for verifying the SIP Identity header's signature, ensuring the authenticity of the caller's information. The CNAM (Caller Name) database provides additional caller ID information, helping to identify the caller more accurately. This combined verification ensures a robust check against potential spoofing or fraudulent activities, significantly enhancing the security and reliability of the call setup.

For reference, the CNAM (Caller Name) database is a system used by telecommunication service providers to store and retrieve the caller ID information associated with a phone number. When a call is made, the CNAM database provides additional information about the caller, such as their name and, in some cases, their location. This information is displayed on the recipient's caller ID, helping to identify who is calling.

When a call is placed, the originating service provider sends the phone number to the terminating service provider. The terminating service provider then queries the CNAM database to retrieve the corresponding caller information. The CNAM database cross-references the phone number with its stored records and returns the caller's name and other relevant details. This process enhances the accuracy and reliability of caller ID information, aiding in the detection and prevention of fraudulent or spoofed calls.

The CNAM database is an essential component in maintaining trust in telecommunication systems, as it allows recipients to see not just the number but also the name of the caller, providing additional context that can help in verifying the legitimacy of the call. This is particularly useful in preventing vishing (voice phishing) attacks, where attackers often use spoofed numbers to trick victims. By providing accurate caller information, the CNAM database helps recipients make informed decisions about whether to answer a call or consider it suspicious.

If the verification identifies any issues, the call is directed to the Rejected/Terminated Calls (212) pool. Calls are rejected or terminated if they originate from blocked regions, exhibit abnormal call durations, fail to authenticate the caller identity, or come from new locations outside the caller's regular pattern. This step ensures that suspicious calls are stopped early in the process, preventing potential scams and safeguarding the recipient from fraudulent activities.

Upon successful verification, the call proceeds to Call Placed to Customer Based on Decision by Verification Service at Destination Service Provider with the Caller ID Details Identified and Attested (214). At this point, the AI/ML engine begins its analysis, assessing data from the CNAM database based on learning patterns to identify any anomalies with the originator and the available SIP header data.

In the Data from CNAM Database Assessed by AI/ML Engine Based On Learning Patterns (216) step, the AI/ML engine scrutinizes the data for any signs of fraudulent activity. The engine employs sophisticated machine learning algorithms to consider various parameters such as calls from blocked regions, abnormal call durations, and new calls from unusual locations. This analysis is crucial for identifying suspicious activity early in the call process. The AI/ML engine's self-learning capabilities enable it to continually improve its detection accuracy based on new data and evolving threat patterns, ensuring the system remains effective against emerging vishing techniques. In other words, Data from the CNAM database is assessed by the AI/ML engine, which uses sophisticated learning patterns and algorithms to identify any anomalies associated with the originator. This assessment is performed by analyzing the caller information retrieved from the CNAM database and comparing it with historical data and known patterns of legitimate and fraudulent calls. The AI/ML engine examines various parameters, including the caller's name, location, and calling behavior, to detect any inconsistencies or suspicious activities.

Additionally, the AI/ML engine analyzes the available SIP header data, which includes detailed authentication information such as the caller identity, caller location, call initiation timestamp, and the digital certificates used for verification. By combining the CNAM data with the SIP header data, the AI/ML engine can perform a comprehensive analysis to determine the legitimacy of the call.

This dual assessment approach allows the AI/ML engine to identify potential anomalies more accurately, such as discrepancies in caller information, unusual call patterns, or attempts to spoof the caller ID. By leveraging both the CNAM data and the SIP header data, the system enhances its ability to detect and prevent vishing attacks, thereby providing a more robust and reliable defense against fraudulent calls.

If the AI/ML engine identifies the call initiator as a potential scammer, the process moves to Call Initiator is Potential Scammer? (218). If the answer is yes, the call is Rejected/Terminated (220). In this step, the call is blocked on the customer's device, and the customer is notified of the failed attack. This proactive approach prevents fraudulent interactions before they can cause harm, effectively stopping the scammer and protecting the customer from potential financial or personal information theft.

If the AI/ML engine cannot definitively identify the call as fraudulent or the call is initially flagged as not fraudulent, the call proceeds to Call Will Be Placed (222). Once the call is placed, it undergoes further examination using the Viterbi algorithm for real-time analysis of the communication. This examination can be an on-going analysis during the entirety of the call if desired or only an initial analysis if preferred.

The Viterbi Algorithm (224) is a sophisticated tool used for real-time speech analysis. This algorithm converts the input speech into text, allowing for detailed examination. It involves model combination, including acoustic models, language models, and pronunciation models. The speech Hidden Markov Model (HMM) uses states and observations to determine the most probable sequence of states based on the input speech. The process includes initialization, recursion, termination, and backtracking to ensure accurate transcription and analysis. The text output involves phoneme-to-word mapping, language model application, and final text output, providing a comprehensive analysis of the spoken content.

More specifically, the Viterbi algorithm is a dynamic programming algorithm used for decoding the most likely sequence of states, often applied in the context of hidden Markov models (HMMs). In speech recognition, it is particularly useful for converting spoken language into text by finding the most probable sequence of words given a sequence of observed sounds.

The Viterbi algorithm can be applied to speech recognition as follows. First, speech is provided as an input to the algorithm or engine executing the same. The input speech refers to the raw audio signal captured by a microphone. This signal is typically a continuous wave of sound that varies in amplitude and frequency over time.

Next is model combination integration or selection. In speech recognition, model combination refers to the integration of various models to improve accuracy. These models include acoustic models, language models, and pronunciation models. Acoustic models represent the relationship between the audio signal and the phonetic units of speech. Language models provide the probabilities of sequences of words. Pronunciation models map words to their phonetic representations.

Speech HMM (Hidden Markov Model) refers to a hidden Markov model is a statistical model used to represent the probability distributions over sequences of observations. In speech recognition, an HMM represents the sequence of phonemes or words and their transitions. States correspond to the phonetic units or sub-units (such as phonemes or their parts). Observations represent the acoustic signal features derived from the input speech.

State decomposition involves breaking down the speech signal into smaller, more manageable units. Each state in the HMM corresponds to a specific phoneme or part of a phoneme. The speech signal is decomposed into frames, typically 10-20 milliseconds long, and each frame is analyzed to extract features like Mel-Frequency Cepstral Coefficients (MFCCs).

Speech states refer to the individual states within the HMM that correspond to specific phonetic units. Each state has a probability distribution over the possible observations (acoustic features). Transitions between states are also probabilistic and model the temporal structure of speech.

The Viterbi algorithm can be applied to find the most probable sequence of states (phonemes) given the observed sequence of acoustic features (input speech). A sample implementation can be considered as follows:

a. Initialization: Set up a matrix where rows represent states and columns represent time steps (frames of the speech signal). Initialize the starting probabilities.

b. Recursion: For each time step, compute the most probable state transition by considering the probabilities of previous states and the observation likelihood.

c. Termination: Identify the state sequence with the highest probability at the final time step.

d. Backtracking: Trace back through the matrix to determine the most likely sequence of states.

Text Output:

a. The final output of the Viterbi algorithm is the most likely sequence of states, which corresponds to a sequence of phonemes or words. This sequence is then mapped to text using the pronunciation model and language model.

b. Phoneme to Word Mapping: Convert the sequence of phonemes into words based on the pronunciation model.

c. Language Model Application: Use the language model to ensure the sequence of words makes sense contextually and syntactically.

d. Final Text Output: Produce the recognized text that corresponds to the input speech.

An example workflow using this algorithm is as follows:

a. Input Speech: An audio signal of someone saying "Hello, how are you?" is captured.

b. Feature Extraction: The audio signal is decomposed into frames, and features like MFCCs are extracted.

c. HMM Initialization: An HMM is set up with states representing phonemes.

d. Viterbi Initialization: A matrix is initialized with the starting probabilities.

e. Viterbi Recursion: For each frame, the most likely state transitions are computed.

f. Backtracking: The most likely sequence of states (phonemes) is determined.

g. Phoneme to Text Conversion: The sequence of phonemes is converted into words using the pronunciation model.

h. Language Model Application: The sequence of words is refined using the language model.

i. Final Text Output: The recognized text "Hello, how are you?" is produced.

In summary, the Viterbi algorithm is crucial for decoding the sequence of phonemes from the input speech, leveraging HMMs, state decomposition, and model combination to ultimately convert spoken language into text.

Once the speech is converted to text, it moves to the Anomaly Pattern Detector (226). This engine processes the converted text along with the SIP data, analyzing for possible scamming patterns. The detector looks for sudden spikes in call volume, basic vishing patterns, differences in voice signal ranges, and flags requests for sensitive data. It also detects urgency in obtaining information, which is a common trait in vishing attacks. This multi-layered analysis ensures that even subtle indicators of fraudulent activity are identified and acted upon.

More specifically, the anomaly pattern detector processes the converted text along with the combined SIP data. This involves a thorough analysis where the engine examines the converted text for any signs of suspicious activity. The engine looks for possible scamming patterns by identifying sudden spikes in call volume, which may indicate a mass vishing attack. It analyzes basic vishing patterns, such as repetitive or scripted language that is commonly used in fraudulent calls.

Additionally, the engine determines differences in voice signal range, which can help identify if the voice characteristics of the caller deviate from the norm. This includes detecting any inconsistencies in the caller's speech that may suggest the use of voice-altering technologies. The detector also flags any requests for sensitive data, such as personal identification numbers or passwords, which are common in vishing attempts.

Furthermore, the anomaly pattern detector identifies the urgency to obtain information, which is a typical tactic used by scammers to pressure victims into providing confidential information quickly. By combining these various indicators, the engine can effectively flag suspicious calls, providing an additional layer of security to prevent vishing attacks.

If the anomaly pattern detector identifies a scam match at Anomaly Pattern Detector Identifies Scam Match? (228), the call can be terminated immediately, and the customer is notified. This step ensures that any detected fraudulent activity results in swift action to protect the customer. If no fraudulent patterns or unknown patterns are detected, the call can be allowed to continue (230), with continuous monitoring and processing in real-time to ensure ongoing security if desired. This ensures that legitimate calls are not unnecessarily disrupted, while maintaining vigilance against potential threats.

In summary, FIG. 2 details a comprehensive system that integrates various technologies to verify, analyze, and authenticate calls, ensuring robust protection against vishing attacks. It showcases the detailed interactions between the scammer, service providers, verification services, AI/ML systems, and pattern detection engines, illustrating a multi-layered approach to securing voice communications. By employing a combination of SIP header customization, digital certificates, AI/ML analysis, real-time speech transcription, and anomaly detection, the system effectively detects and mitigates fraudulent activities, protecting customers from potential scams and enhancing the overall security of voice communications. This thorough and proactive approach ensures that every aspect of the call, from initiation to termination, is scrutinized and verified, significantly enhancing the security and reliability of voice communications. The integration of these technologies into a cohesive system not only protects customers from vishing attacks but also instills confidence in the overall security of their voice communications, providing peace of mind and a robust defense against fraudulent activities.

FIG. 3 provides a comprehensive and detailed flow diagram that meticulously outlines the entire process of handling a call from its initiation to its termination, ensuring robust protection against vishing attacks. The diagram illustrates the various interactions between entities and technologies that work together to verify, authenticate, and analyze calls to prevent fraudulent activities.

The process begins with Calling Party Initiates Call (300). This initiation triggers the involvement of the originating telephone service provider (302), which takes over the responsibility of handling the call setup. The originating service provider sends a SIP (Session Initiation Protocol) Invite (304) to set up the call. This SIP invite is a crucial step as it contains the initial details required to establish the communication path between the calling and receiving parties, setting the foundation for subsequent verification and authentication steps.

Following the initiation of the SIP invite, Authentication Service (306) is utilized. The originating service provider uses this service to generate detailed authentication information that is embedded in the SIP header to verify the caller's identity. At this stage, the SIP header includes different levels of attestation-full, partial, or gateway-indicating the degree of verification performed on the caller's identity. Full Attestation/Partial Attestation/Gateway Attestation (308) ensures the call's integrity at varying levels of confidence. Full attestation signifies that the caller's identity has been thoroughly verified, partial attestation indicates a partial verification, and gateway attestation means the call is verified to the extent possible by the gateway.

SIP Identity Header (310) is then created, containing crucial information such as the calling number, called number, current timestamp, attestation level, and originating identifier. These elements are essential for the subsequent stages of verification. Calling Number, Called Number, Current Time Stamp, Attestation Level, Originating Identifier (312) ensure a robust initial check before the call proceeds further.

Once the SIP identity header is created, AI/ML (Artificial Intelligence/Machine Learning) System (316) steps in to analyze the SIP data. This system uses advanced algorithms to scrutinize the data for any anomalies that might indicate a potential scam. The AI/ML system considers various parameters, such as calls from blocked regions, abnormal call durations, and new calls from unusual locations. This analysis is crucial for identifying suspicious activity early in the call process. The AI/ML system's self-learning capabilities enable it to continually improve its detection accuracy based on new data and evolving threat patterns, ensuring the system remains effective against emerging vishing techniques.

If the AI/ML system identifies the call as potentially fraudulent, the call is terminated to prevent the scammer from proceeding and to protect the recipient from potential harm. The decision to terminate the call is based on the analysis performed by the AI/ML system. Call Terminated (314) is triggered if the system detects any suspicious activity, blocking the call on the customer's device and notifying the customer of the failed attack (315). This proactive approach helps prevent fraudulent interactions before they can cause harm, effectively stopping the scammer in their tracks and protecting the customer from potential financial or personal information theft.

If the AI/ML system cannot definitively identify the call as fraudulent, the call is allowed to proceed, leading to further scrutiny. Decision to Terminate (318) ensures only calls flagged by AI/ML are blocked. Verification Service (320) at the terminating service provider then takes over to perform additional verification checks. This service accesses the Certificate Repository (322) to verify the digital certificates included in the SIP identity header. These certificates ensure the call's origin and data integrity are legitimate, providing an additional layer of security. The certificate repository stores the digital certificates required for verifying the SIP identity header's signature, ensuring the authenticity of the caller's information.

Terminating Telephone Service Provider (324) receives the call and performs further verification checks based on the data provided by the originating service provider and the verification service. If the verification identifies any issues, the call is directed to the rejected/terminated calls pool. Calls are rejected or terminated if they originate from blocked regions, exhibit abnormal call durations, fail to authenticate the caller identity, or come from new locations outside the caller's regular pattern. This step ensures that suspicious calls are stopped early in the process, preventing potential scams and safeguarding the recipient from fraudulent activities.

Upon successful verification, the call proceeds, and the AI/ML engine continues to assess data from the CNAM (Caller Name) database based on learning patterns to identify any anomalies with the originator and the available SIP header data. The AI/ML engine scrutinizes the data for any signs of fraudulent activity, employing sophisticated machine learning algorithms to consider various parameters such as calls from blocked regions, abnormal call durations, and new calls from unusual locations. This analysis is critical for identifying suspicious activity early in the call process, leveraging the AI/ML engine's self-learning capabilities to continually improve its detection accuracy based on new data and evolving threat patterns.

If the AI/ML engine identifies the call initiator as a potential scammer, the call is terminated. The call is blocked on the customer's device, and the customer is notified of the failed attack. This proactive approach helps prevent fraudulent interactions before they can cause harm, effectively stopping the scammer and protecting the customer from potential financial or personal information theft.

If the AI/ML engine cannot definitively identify the call as fraudulent, the call proceeds. Once the call is placed, it undergoes further examination using the Viterbi Algorithm for real-time analysis of the communication. The Viterbi algorithm is a sophisticated tool used for real-time speech analysis. This algorithm converts the input speech into text, allowing for detailed examination. It involves model combination, including acoustic models, language models, and pronunciation models. The speech Hidden Markov Model (HMM) uses states and observations to determine the most probable sequence of states based on the input speech. The process includes initialization, recursion, termination, and backtracking to ensure accurate transcription and analysis. The text output involves phoneme-to-word mapping, language model application, and final text output, providing a comprehensive analysis of the spoken content.

Once the speech is converted to text, the Anomaly Pattern Detector processes the converted text along with the SIP data, analyzing for possible scamming patterns. The detector looks for sudden spikes in call volume, basic vishing patterns, differences in voice signal ranges, and flags requests for sensitive data. It also detects urgency in obtaining information, which is a common trait in vishing attacks. This multi-layered analysis ensures that even subtle indicators of fraudulent activity are identified and acted upon.

If the anomaly pattern detector identifies a scam match, the call is terminated immediately, and the customer is notified. This step ensures that any detected fraudulent activity results in swift action to protect the customer. If no or unknown patterns are detected, the Call Allowed to Continue, with continuous monitoring and processing to ensure ongoing security. This ensures that legitimate calls are not unnecessarily disrupted, while maintaining vigilance against potential threats.

In summary, FIG. 3 details a comprehensive system that integrates various technologies to verify, analyze, and authenticate calls, ensuring robust protection against vishing attacks. The diagram showcases the detailed interactions between the scammer, service providers, verification services, AI/ML systems, and pattern detection engines, illustrating a multi-layered approach to securing voice communications. By employing a combination of SIP header customization, digital certificates, AI/ML analysis, real-time speech transcription, and anomaly detection, the system effectively detects and mitigates fraudulent activities, protecting customers from potential scams and enhancing the overall security of voice communications. This thorough and proactive approach ensures that every aspect of the call, from initiation to termination, is scrutinized and verified, significantly enhancing the security and reliability of voice communications. The integration of these technologies into a cohesive system not only protects customers from vishing attacks but also instills confidence in the overall security of their voice communications, providing peace of mind and a robust defense against fraudulent activities. The detailed conceptual flow in FIG. 3 illustrates how each component of the system works together seamlessly to deliver a comprehensive and effective solution to the problem of vishing.

FIG. 4 depicts a sample class diagram of an information-security system for detecting and preventing vishing attacks. The diagram illustrates the components of the system, their functions, and the relationships between them.

The Originating Service Provider (400) is responsible for initiating calls and sending Session Initiation Protocol (SIP) invites. It includes functions such as initiateCall( ), which initiates a call, sendSIPInvite( ), which sends the SIP invite, and includeAuthInfo( ), which includes detailed authentication information in the SIP header like caller identity, caller location, and call initiation timestamp.

The STIR/SHAKEN Framework (402) is integrated with the originating service provider and is configured to transmit the call data and employ digital certificates to verify the authenticity of the calling number. Its functions include transmitCallData( ), which transmits the call data, verify- CallerID( ), which verifies the calling number's authenticity using digital certificates, and generateDigitalCert( ), which generates the digital certificates to ensure the caller ID has not been spoofed.

The Destination Service Provider (404) receives the SIP data transmitted by the originating service provider and verifies it using a verification service. It includes receiveSIPData( ), which receives the SIP data, verifySIPData( ), which verifies the SIP data using a verification service, and decodeJWT( ), which decodes the SIP Identity header containing a JSON web token (JWT) with attestation details, origin and destination identifiers, and timestamps.

The Caller Name (CNAM) Database (406) cross-references the verified data and retrieves additional caller identification information. Its functions are crossReferenceData( ), which cross-references the verified data, retrieveCallerInfo( ), which retrieves additional caller identification information, and storeCallerID( ), which stores the caller ID information.

The Third-Party Database (408) is integrated with the destination service provider to store the verified SIP data and CNAM information for further analysis. Its functions include storeVerifiedData( ), which stores the verified SIP data and CNAM information, provideDataForAnalysis( ), which provides the stored data for further analysis, and maintainDataIntegrity( ), which ensures the integrity of the stored data.

The AI/ML Engine (410) analyzes the SIP data and CNAM information to detect anomalies by comparing them against known patterns of legitimate and fraudulent calls. Its functions are analyzeSIPData( ), which analyzes the SIP data and CNAM information, detectAnomalies( ), which detects anomalies such as calls from blocked regions, abnormal call durations, and new calls from unusual locations, and updateModel( ), which continuously learns from new data and evolves threat patterns to improve detection accuracy.

The Call Blocking Module (412) is integrated with the AI/ML engine to block calls and notify customers if potential fraud is detected. Its functions include blockCall( ), which blocks the call if potential fraud is detected, notifyCustomer( ), which notifies the customer of the blocked call, and logBlockedCall( ), which logs the details of the blocked call.

The Speech Analysis Module (414) performs real-time speech analysis if the AI/ML engine is indecisive and converts the spoken language into text using the Viterbi algorithm. Its functions are performSpeechAnalysis( ), which performs real-time speech analysis, convertSpeechToText( ), which converts the spoken language into text, and useViterbiAlgorithm( ), which applies the Viterbi algorithm to determine the most probable sequence of states given the observed acoustic features.

The Anomaly Pattern Detector (416) processes the converted text along with the SIP data and CNAM information to identify vishing patterns by analyzing both the linguistic content and the call metadata. Its functions include identifyVishingPatterns( ), which identifies vishing patterns such as sudden spikes in call volume, typical vishing patterns, differences in voice signal ranges, and requests for sensitive information, processConvertedText( ), which processes the converted text along with the SIP data, and flagSuspiciousActivity( ), which flags suspicious activities based on the analysis.

The Call Termination Module (418) terminates the call and informs the customer if a match with known vishing patterns is identified, preventing the continuation of the fraudulent call and alerting the customer to the attempted scam. Its functions are terminateCall( ), which terminates the call, informCustomer( ), which informs the customer about the termination and the detected threat, and record-TerminationReason( ), which records the reason for the call termination.

The Continuous Monitoring Module (420) continuously monitors the call for any suspicious patterns and periodically re-evaluates the call data to ensure ongoing security. Its functions include monitorCall( ), which continuously monitors the call, updateAIModel( ), which updates the AI/ML engine with new information to adapt to evolving vishing tactics, and re-evaluateCallData( ), which periodically re-evaluates the call data.

The relationships between these classes illustrate how the system components interact to detect and prevent vishing attacks. The Originating Service Provider (400) is integrated with the STIR/SHAKEN Framework (402), which transmits call data to the Destination Service Provider (404). The Destination Service Provider cross-references the data with the Caller Name (CNAM) Database (406) and stores the data in the Third-Party Database (408). The Third-Party Database provides data to the AI/ML Engine (410), which analyzes the data for anomalies and interacts with the Call Blocking Module (412). The Call Blocking Module passes indecisive calls to the Speech Analysis Module (414), which provides converted text to the Anomaly Pattern Detector (416). The Anomaly Pattern Detector identifies vishing patterns and informs the Call Termination Module (418), which monitors and updates the Continuous Monitoring Module (420). This detailed explanation of the class diagram provides an overview of the components, their functions, and the interactions within the information-security system designed to detect and prevent vishing attacks.

FIG. 5 illustrates a sample flow diagram of an information-security method for detecting and preventing vishing attacks. The process starts at step 500.

At step 502, a call is initiated, and a Session Initiation Protocol (SIP) invite is sent from an originating service provider. This SIP invite includes detailed authentication information in the SIP header, such as caller identity, caller location, and call initiation timestamp.

In step 504, the call data is transmitted using the STIR/SHAKEN framework. This framework employs digital certificates to verify the authenticity of the calling number, ensuring that the caller ID has not been spoofed. The STIR/SHAKEN framework uses public key cryptography to generate the digital certificates, providing a robust mechanism to prevent caller ID spoofing.

At step 506, the SIP data is received at a destination service provider and is verified using a verification service. This service decodes the SIP Identity header containing a JSON web token (JWT) with attestation details, origin and destination identifiers, and timestamps to confirm the validity of the calling number. The verification service utilizes a certificate repository to validate the digital certificates included in the SIP Identity header, comparing the certificates against trusted sources to ensure their validity.

Step 508 involves cross-referencing the verified data with a Caller Name (CNAM) database to retrieve additional caller identification information. This step helps in further authenticating the caller's identity by correlating it with known caller information.

In step 510, the verified SIP data and CNAM information are stored in a third-party database for further analysis. This step ensures that all authentication and verification details are available for subsequent processing. The third-party database is a cloud-based application integrated with the telephone service provider, which enables real-time and post-call analysis, ensuring continuous monitoring and rapid response to detected anomalies.

The next step, 512, involves analyzing the SIP data and CNAM information using an artificial intelligence and machine learning (AI/ML) engine. This engine detects anomalies by comparing the SIP data against known patterns of legitimate and fraudulent calls, identifying anomalies such as calls from blocked regions, abnormal call durations, and new calls from unusual locations. The AI/ML engine continuously learns from new data and evolving threat patterns to improve its accuracy in detecting anomalies, incorporating feedback from previously detected fraudulent calls to enhance its predictive capabilities.

If the AI/ML engine detects potential fraud based on the analysis of the SIP data and CNAM information, step 514 involves blocking the call and notifying the customer. This step prevents the fraudulent call from reaching the customer. The call blocking module logs the details of the blocked call for future reference.

If the AI/ML engine is indecisive, the call is allowed to proceed to step 516, where real-time speech analysis is performed using the Viterbi algorithm. This algorithm converts the spoken language into text by determining the most probable sequence of states given the sequence of observed acoustic features, including phonemes and words. The Viterbi algorithm integrates acoustic models, language models, and pronunciation models to accurately transcribe and analyze the speech in real-time, providing a detailed linguistic analysis that helps identify suspicious conversational patterns.

At step 518, the converted text, along with the SIP data and CNAM information, is processed using an anomaly pattern detector. This detector identifies vishing patterns by analyzing both the linguistic content and the call metadata, looking for indicators such as sudden spikes in call volume, typical vishing patterns, differences in voice signal ranges, and requests for sensitive information. The anomaly pattern detector uses machine learning techniques to recognize known vishing patterns based on the converted text and SIP data, identifying specific indicators of fraudulent activity such as urgent requests for personal information or inconsistencies in the caller's speech.

If the anomaly pattern detector identifies a match with known vishing patterns, the call is terminated, and the customer is informed at step 520, thereby preventing the continuation of the fraudulent call and alerting the customer to the attempted scam. The call termination module records the reason for the call termination and sends an alert message to the customer's device, including details of the detected threat and recommendations for further actions to protect their information.

If no suspicious patterns are detected, the method proceeds to step 522, where the call continues to be monitored and processed. This step ensures ongoing security by periodically re-evaluating the call data and updating the AI/ML engine with new information to adapt to evolving vishing tactics. The continuous monitoring module updates the AI/ML model with the latest threat intelligence and adapts to new scam tactics as they emerge, ensuring that the system remains effective against evolving threats.

The process concludes at step 524, where the overall monitoring and analysis are completed. This detailed explanation of FIG. 5 provides a comprehensive overview of the steps involved in the information-security method designed to detect and prevent vishing attacks, emphasizing the integration of various technologies and methods to ensure robust security measures.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. An information-security method for detecting and preventing vishing attacks, comprising the steps of:

initiating a call and sending a Session Initiation Protocol (SIP) invite from an originating service provider, wherein the SIP invite includes detailed authentication information in a SIP header comprising caller identity, caller location, and call initiation timestamp;

transmitting call data using a Secure Telephone Identity Revisited and Signature-based Handling of Asserted Information Using toKENS (STIR/SHAKEN) framework, which employs digital certificates to verify authenticity of a calling number, ensuring that a caller ID has not been spoofed;

receiving SIP data at a destination service provider and verifying the call data that has been transmitted using a verification service, which decodes the SIP header containing a JSON web token (JWT) with attestation details, origin and destination identifiers, and timestamps, to confirm validity of the calling number;

cross-referencing the SIP data as verified with a Caller Name (CNAM) database to retrieve additional caller identification information;

storing verified SIP data and CNAM information in a third-party database for further analysis, ensuring that all authentication and verification details are available for subsequent processing;

analyzing the SIP data and CNAM information using an artificial intelligence and machine learning (AI/ML) engine to detect anomalies comprising calls from blocked regions, abnormal call durations, and new calls from unusual locations, by comparing the SIP data against known patterns of legitimate and fraudulent calls;

blocking the call and notifying a customer if the AI/ML engine detects potential fraud based on the analysis of the SIP data and CNAM information, preventing the fraudulent call from reaching the customer;

allowing the call to proceed if the AI/ML engine is indecisive and performing real-time speech analysis using a Viterbi algorithm, which converts spoken language into text by determining a most probable sequence of states given a sequence of observed acoustic features, including phonemes and words;

processing converted text along with the SIP data and CNAM information using an anomaly pattern detector to identify vishing patterns comprising sudden spikes in call volume, typical vishing patterns, differences in voice signal ranges, and requests for sensitive information, by analyzing both linguistic content and call metadata;

terminating the call and informing the customer if the anomaly pattern detector identifies a match with known vishing patterns, thereby preventing continuation of the call and alerting the customer to an attempted scam; and continuing to monitor and process the call if no suspicious patterns are detected, ensuring ongoing security by periodically re-evaluating the call data and updating the AI/ML engine with new information to adapt to evolving vishing tactics.

2. The information-security method of claim 1, wherein the detailed authentication information in the SIP header further includes full attestation, partial attestation, or gateway attestation based on a level of verification performed on the caller identity, with the full attestation indicating a highest level of confidence in the authenticity in the caller.

3. The information-security method of claim 2, wherein the STIR/SHAKEN framework uses public key cryptography to generate the digital certificates that are used to verify the authenticity of the calling number, ensuring that the calling number cannot be easily spoofed by malicious actors.

4. The information-security method of claim 3, wherein the verification service at the destination service provider utilizes a certificate repository to validate the digital certificates included in the SIP header, comparing the digital certificates against trusted sources to ensure validity.

5. The information-security method of claim 4, wherein the third-party database is a cloud-based application integrated with a telephone service provider to store detailed authentication and verification data for real-time and post-call analysis, enabling continuous monitoring and rapid response to detected anomalies.

6. The information-security method of claim 5, wherein the AI/ML engine continuously learns from new data and evolving threat patterns to improve accuracy in detecting anomalies, incorporating feedback from previously detected fraudulent calls to enhance predictive capabilities.

7. The information-security method of claim 6, wherein the Viterbi algorithm integrates acoustic models, language models, and pronunciation models to accurately transcribe and analyze speech in real-time, providing a detailed linguistic analysis that helps identify suspicious conversational patterns.

8. The information-security method of claim 7, wherein the anomaly pattern detector uses machine learning techniques to recognize known vishing patterns based on the text as converted and SIP data, identifying specific indicators of fraudulent activity comprising urgent requests for personal information or inconsistencies in speech of the caller.

9. The information-security method of claim 8, wherein the customer is notified of a potential fraud attempt through an alert message sent to a device upon call termination, including details of a detected threat and recommendations for further actions to protect information.

10. The information-security method of claim 9, wherein continuous monitoring and processing of the call involve periodic re-analysis of the call data to ensure ongoing security against vishing attacks, updating the AI/ML engine with latest threat intelligence and adapting to new scam tactics.

11. An information-security system for detecting and preventing vishing attacks, comprising:

an originating service provider configured to initiate a call and send a Session Initiation Protocol (SIP) invite, wherein the SIP invite includes detailed authentication information in a header comprising caller identity, caller location, and call initiation timestamp;

a Secure Telephone Identity Revisited and Signature-based Handling of Asserted Information Using toKENS (STIR/SHAKEN) framework integrated with the originating service provider, configured to transmit call data and employ digital certificates to verify authenticity of a calling number, ensuring that a caller ID has not been spoofed;

a destination service provider configured to receive SIP data and verify the call data that has been transmitted using a verification service, wherein the verification service decodes the SIP header containing a JSON web token (JWT) with attestation details, origin and destination identifiers, and timestamps to confirm validity of the calling number;

a Caller Name (CNAM) database configured to cross-reference the call data as verified and retrieve additional caller identification information;

a third-party database integrated with the destination service provider, configured to store verified SIP data and CNAM information for further analysis;

an artificial intelligence and machine learning (AI/ML) engine configured to analyze the SIP data and CNAM information to detect anomalies comprising calls from blocked regions, abnormal call durations, and new calls from unusual locations, by comparing the SIP data against known patterns of legitimate and fraudulent calls;

a call blocking module integrated with the AI/ML engine, configured to block the call and notify a customer if the AI/ML engine detects potential fraud based on the analysis of the SIP data and CNAM information;

a speech analysis module configured to allow the call to proceed if the AI/ML engine is indecisive, and perform real-time speech analysis using a Viterbi algorithm, which converts a spoken language into text by determining a most probable sequence of states given a sequence of observed acoustic features, including phonemes and words;

an anomaly pattern detector integrated with the speech analysis module, configured to process the text that was converted along with the SIP data and CNAM information to identify vishing patterns comprising sudden spikes in call volume, typical vishing patterns, differences in voice signal ranges, and requests for sensitive information, by analyzing both linguistic content and call metadata;

a call termination module configured to terminate the call and inform the customer if the anomaly pattern detector identifies a match with known vishing patterns, thereby preventing continuation of the call and alerting the customer to an attempted scam; and a continuous monitoring module configured to monitor and process the call if no suspicious patterns are detected, ensuring ongoing security by periodically re-evaluating the call data and updating the AI/ML engine with new information to adapt to evolving vishing tactics.

12. The information-security system of claim 11, wherein the detailed authentication information in the SIP header further includes full attestation, partial attestation, or gateway attestation based on a level of verification performed on the caller identity, with the full attestation indicating a highest level of confidence in the authenticity of the caller.

13. The information-security system of claim 12, wherein the STIR/SHAKEN framework uses public key cryptography to generate the digital certificates that are used to verify the authenticity of the calling number, ensuring that the calling number cannot be easily spoofed by malicious actors.

14. The information-security system of claim 13, wherein the verification service at the destination service provider utilizes a certificate repository to validate the digital certificates included in the SIP header, comparing the digital certificates against trusted sources to ensure validity.

15. The information-security system of claim 14, wherein the third-party database is a cloud-based application integrated with a telephone service provider to store detailed authentication and verification data for real-time and post-call analysis, enabling continuous monitoring and rapid response to detected anomalies.

16. The information-security system of claim 15, wherein the AI/ML engine continuously learns from new data and evolving threat patterns to improve accuracy in detecting anomalies, incorporating feedback from previously detected fraudulent calls to enhance predictive capabilities.

17. The information-security system of claim 16, wherein the Viterbi algorithm integrates acoustic models, language models, and pronunciation models to accurately transcribe and analyze speech in real-time, providing a detailed linguistic analysis that helps identify suspicious conversational patterns.

18. The information-security system of claim 17, wherein the anomaly pattern detector uses machine learning techniques to recognize known vishing patterns based on the text that was converted and SIP data, identifying specific indicators of fraudulent activity comprising urgent requests for personal information or inconsistencies in speech of the caller.

19. The information-security system of claim 18, wherein the customer is notified of a potential fraud attempt through an alert message sent to device upon call termination, including details of a detected threat and recommendations for further actions to protect information.

20. An information-security method for detecting and preventing vishing attacks, comprising the steps of:

initiating a call and sending a Session Initiation Protocol (SIP) invite from an originating service provider, wherein the SIP invite includes detailed authentication information in a SIP header;

transmitting call data using a Secure Telephone Identity Revisited and Signature-based Handling of Asserted Information Using toKENS (STIR/SHAKEN) framework, which employs digital certificates to verify authenticity of a calling number;

receiving SIP data at a destination service provider and verifying the call data that has been transmitted using a verification service, which decodes the SIP header containing a JSON web token (JWT) with attestation details;

storing the SIP data as verified in a third-party database for further analysis;

analyzing the SIP data using an artificial intelligence and machine learning (AI/ML) engine to detect anomalies comprising calls from blocked regions, abnormal call durations, and new calls from unusual locations;

blocking the call and notifying a customer if the AI/ML engine detects potential fraud;

allowing the call to proceed if the AI/ML engine is indecisive and performing real-time speech analysis using a Viterbi algorithm, which converts a spoken language into text;

processing the text as converted along with the SIP data using an anomaly pattern detector to identify vishing patterns comprising sudden spikes in call volume, typical vishing patterns, differences in voice signal ranges, and requests for sensitive information;

terminating the call and informing the customer if the anomaly pattern detector identifies a match with known vishing patterns; and continuing to monitor and process the call if no suspicious patterns are detected, ensuring ongoing security.

* * * * *